(12) United States Patent
Makita (10) Patent No.: US 9,664,876 B2
(45) Date of Patent: May 30, 2017

(54) DRIVING APPARATUS, AND LENS APPARATUS AND IMAGE PICKUP APPARATUS INCLUDING THE SAME

(71) Applicant: CANON KABUSHIKI KAISHA, Tokyo (JP)

(72) Inventor: Keisuke Makita, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 214 days.

(21) Appl. No.: 14/578,822

(22) Filed: Dec. 22, 2014

(65) Prior Publication Data

US 2015/0185432 A1    Jul. 2, 2015

(30) Foreign Application Priority Data

Dec. 26, 2013  (JP) ................ 2013-268341

(51) Int. Cl.
  *G02B 7/09* (2006.01)
  *G02B 7/10* (2006.01)
  *G03B 13/34* (2006.01)
  *H04N 5/232* (2006.01)

(52) U.S. Cl.
  CPC ............ *G02B 7/09* (2013.01); *G02B 7/102* (2013.01); *G03B 13/34* (2013.01); *H04N 5/23296* (2013.01)

(58) Field of Classification Search
  None
  See application file for complete search history.

(56) References Cited

U.S. PATENT DOCUMENTS

| 4,881,799 A | 11/1989 | Ohno et al. |
| 5,463,442 A | 10/1995 | Harigaya et al. |
| 5,932,984 A * | 8/1999 | Murakami ........... G02B 27/646 318/268 |
| 6,085,044 A | 7/2000 | Kawanami |
| 2004/0207936 A1 | 10/2004 | Yamamoto et al. |

(Continued)

FOREIGN PATENT DOCUMENTS

JP    4-60508 A    2/1992

OTHER PUBLICATIONS

European Search Report issued in European counterpart application No. EP14004321.7, dated May 11, 2015.

*Primary Examiner* — Timothy J Henn
(74) *Attorney, Agent, or Firm* — Rossi, Kimms & McDowell LLP (57) ABSTRACT

A driving apparatus connected to a lens barrel including a movable optical member to drive the movable optical member, includes: a drive unit driving the movable optical member; a controller controlling the drive unit; a first deriving unit deriving a first information indicating at least one of position or speed of the movable optical member; and a second information indicating at least one of position or speed of the drive unit based on a counter-electromotive voltage generated through the drive of the drive unit; and a selection unit to select the first information or the second information as a selected information according to a state of a backlash of the drive unit, the controller controlling the drive unit based on: the first information or the second information selected by the selection unit; and the command information to direct driving of the movable optical member.

8 Claims, 7 Drawing Sheets

(56) References Cited

U.S. PATENT DOCUMENTS

| | | | |
|---|---|---|---|
| 2009/0102403 A1* | 4/2009 | Lule | H02P 25/034 318/135 |
| 2013/0169857 A1* | 7/2013 | Christo | H04N 5/23212 348/349 |
| 2014/0253788 A1* | 9/2014 | Saito | H02P 8/38 348/357 |

* cited by examiner

DRIVING APPARATUS, AND LENS APPARATUS AND IMAGE PICKUP APPARATUS INCLUDING THE SAME

BACKGROUND OF THE INVENTION

Field of the Invention

The present invention relates to a driving apparatus, and more particularly, to a driving apparatus configured to drive a lens, and a lens apparatus and an image pickup apparatus including the lens driving apparatus.

Description of the Related Art

When a lens is to be driven by a drive apparatus, a lens position is detected by a position detector, and a control signal for eliminating a difference between the detected position and a target position determined based on a position command value is transmitted to a motor, to thereby drive the lens toward the target position (position feedback control). Further, a lens speed determined based on the position detected by the position detector is reflected on a value to be output to the motor, to thereby drive the lens at a constant speed (speed feedback control).

However, the position detector configured to detect the lens position is influenced by a backlash of a gear train of a lens driving mechanism, and hence the rotational position and rotational speed of a motor derived based on detection results of the position detector are inaccurate. Thus, when the rotational speed of motor is to be controlled based on the detection signal, an unintended control signal is transmitted to the motor.

In particular, when the lens is to be operated in a reverse direction, the position detector does not generate any signal immediately due to the backlash. A drive signal is continuously transmitted to the motor until the backlash is eliminated and then a signal is generated by the position detector. As a result, the rotational speed of motor is increased excessively, which may cause an operator to feel uncomfortable with an image at the start of lens movement.

In Japanese Patent Application Laid-Open No. H04-060508, the following system is disclosed. This system includes a first pulse generator configured to generate a pulse in response to lens movement, and a second pulse generator configured to generate a pulse in response to motor drive. The system is configured to control the drive amount of the lens based on an output from the first pulse generator, and to control the rotational speed of motor based on an output from the second pulse generator. Thus, accurate lens drive control is performed without the influence of the backlash of the gear train of the lens driving mechanism.

According to the related art disclosed in Japanese Patent Application Laid-Open No. H04-060508, however, the lens position and the rotational position of motor are detected by separate position detectors. Therefore, at least two position detectors are necessary to control a single movable optical member, thereby raising such problems that the apparatus is upsized and the manufacturing cost is increased.

SUMMARY OF THE INVENTION

In view of the above, it is an object of the present invention to provide a driving apparatus capable of performing accurate lens drive control by suppressing influence of a backlash of a gear train of a lens driving mechanism without using two or more position detectors for controlling a single movable optical member, and to provide a lens apparatus and an image pickup apparatus including the lens driving apparatus.

In order to achieve the above-mentioned object, according to one embodiment of the present invention, there is provided a driving apparatus to be connected to a lens barrel including a movable optical member so as to drive the movable optical member, the driving apparatus including: a drive unit which drives the movable optical member; a controller which controls the drive unit; a first deriving unit which derives a first information indicating at least one of a position or a speed of the movable optical member and a second information indicating at least one of a position or a speed of the drive unit based on a counter-electromotive voltage generated through the drive of the drive unit; and a selection unit configured to select the first information or the second information as a selected information in accordance with a state of a backlash of the drive unit, the controller which controls the drive unit based on: the first information or the second information selected by the selection unit; and the command information to direct driving of the movable optical member.

According to the one embodiment of the present invention, it is possible to provide the driving apparatus suppressed in the influence of the backlash of the gear train of the lens driving mechanism without using two or more position detectors for controlling the single movable optical member, and to provide the lens apparatus and the image pickup apparatus including the lens driving apparatus.

Further features of the present invention will become apparent from the following description of exemplary embodiments with reference to the attached drawings.

DESCRIPTION OF THE EMBODIMENTS

Now, exemplary embodiments of the present invention are described with reference to the attached drawings.

First Embodiment

Figure 1:
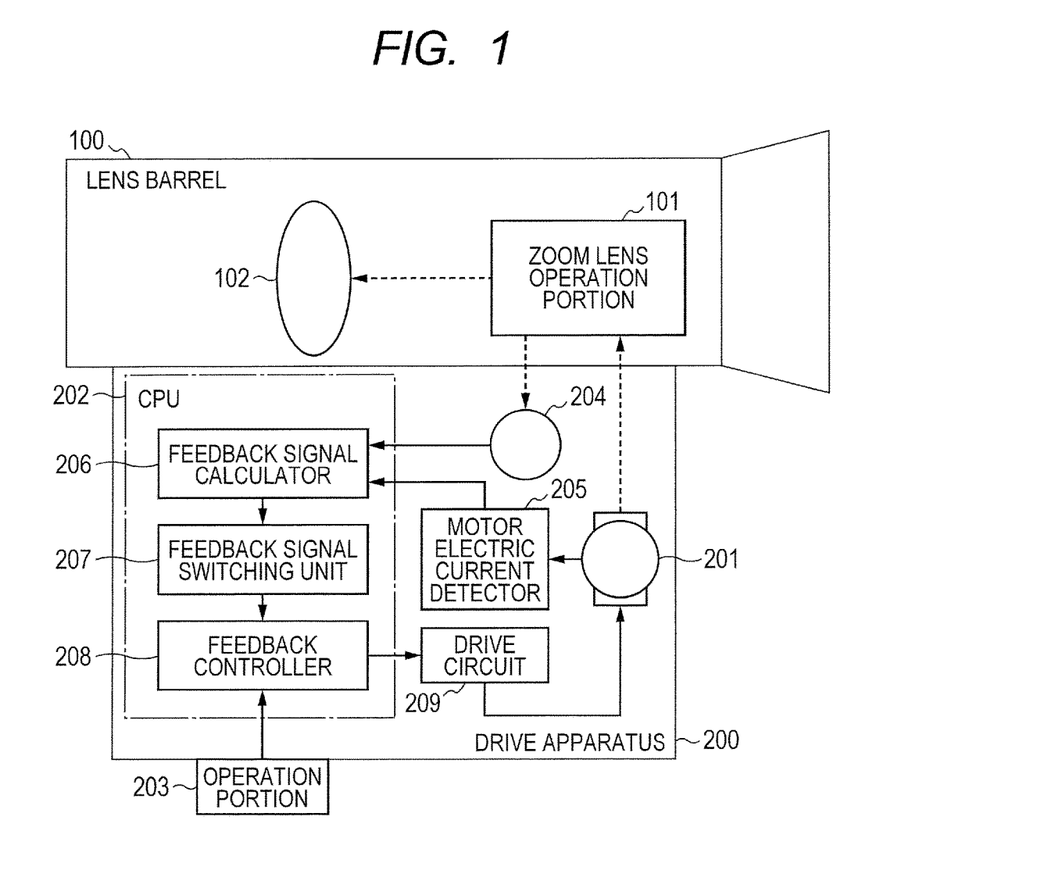
FIG. 1 is a block diagram illustrating a configuration of a driving apparatus according to a first embodiment of the present invention.

FIG. 1 illustrates a configuration of a lens apparatus according to a first embodiment of the present invention.

The lens apparatus includes a lens barrel 100 and a drive apparatus 200. The lens barrel 100 includes a zoom lens operation portion 101 illustrated in FIG. 1, an image pickup optical system including optical adjusting members such as a zoom lens 102, a focus lens (not shown), and an iris (not shown), and an operation unit for the optical adjusting members. The zoom lens 102 being one of the optical adjusting members is hereinafter described as a movable optical member to be driven in the present invention.

The drive apparatus 200 includes a motor 201 (drive unit), a CPU 202, an operation portion 203, a position detector 204 (position detector), a motor electric current detector 205, and a drive circuit 209. The CPU 202 includes a feedback signal calculator 206 (first deriving unit), a feedback signal switching portion 207 (selection unit), and a feedback controller 208 (controller).

Now, the respective components are described.

The zoom lens operation portion 101 of the lens barrel 100 transmits a drive force from the outside to the zoom lens 102 so as to move the zoom lens 102 in an optical axis direction, to thereby change a focal length. The zoom lens operation portion 101 is constructed of, for example, a zoom operating ring. When the lens barrel 100 is used under a state in which the drive apparatus 200 is not connected to the lens barrel 100, the zoom lens 102 can be moved in the optical axis direction by an operator who manually operates the zoom operating ring, to thereby perform a zoom operation.

The operation portion 203 of the drive apparatus 200 is operated by the operator, and outputs a command signal. The command signal includes a command information to direct the driving of the zoom lens 102. For example, the command information is information to direct a drive direction and a drive speed (that may be a drive amount and a drive position).

The position detector 204 is connected to the zoom lens operation portion 101 through intermediation of a gear train, and generates a pulse in accordance with a movement amount of the zoom lens operation portion 101. The generated pulse is used for deriving a position and speed of the zoom lens (movable optical member) 102 which is a first information by the feedback signal calculator (first deriving unit) 206 described later.

At a part between the position detector 204 and the zoom lens operation portion 101, a configuration for reducing a backlash that may be generated therebetween is employed. For example, there is employed a scissors gear having two gears biased with a spring and engaged with a mating gear in a sandwiching manner, to thereby eliminate the backlash. The position detector 204 is moved in association with the movement of the zoom lens operation portion 101, and hence, when a mechanism such as the scissors gear is applied, the position of the zoom lens operation portion 101 can be detected without the backlash.

Note that, the motor 201 is also engaged with the zoom lens operation portion 101 through intermediation of gears. The drive force output from the motor 201 so as to drive the zoom lens 102 is transmitted to the zoom lens operation portion 101. The scissors gear may also be employed at a gear engagement portion between the motor 201 and the zoom lens operation portion 101, but when the rotational load of the motor 201 is significant, the effect of reducing the backlash by the scissors gear cannot be attained substantially. Further, the motor 201 has a backlash of a reduction gear train (not shown), and hence the backlash between the motor 201 and the zoom lens operation portion 101 cannot be eliminated.

The motor electric current detector 205 detects an electric current flowing when the motor 201 is driven. For example, the motor electric current detector 205 detects a voltage at both ends of a resistor (not shown) connected to the motor 201 in series, and divides the voltage by a resistance value of the resistor, to thereby detect the electric current flowing through the motor 201. The detected electric current is used by the feedback signal calculator (first deriving unit) 206 described later for deriving a rotational position and rotational speed of the motor 201 which is a second information.

The feedback controller 208 performs position feedback control and speed feedback control based on a feedback signal output from the feedback signal switching portion 207 described later, and on the command signal (including the command information) output from the operation portion 203, to thereby generate a drive signal.

The drive circuit 209 amplifies the drive signal output from the feedback controller 208 via a D/A converter (not shown), to thereby drive the motor 201.

Figure 2:
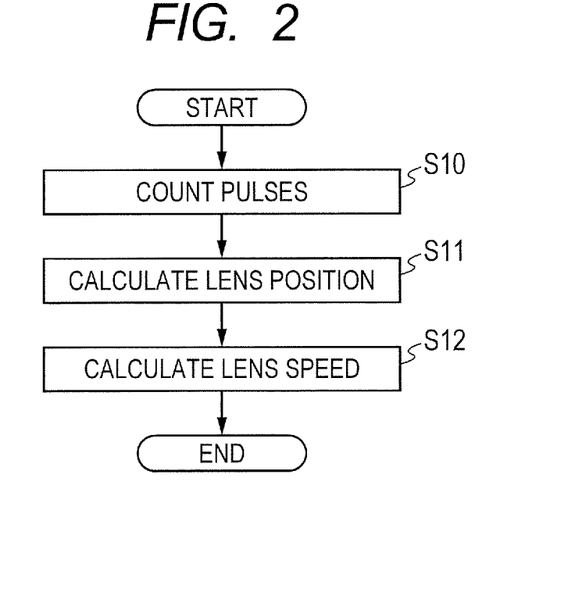
FIG. 2 is a flow chart illustrating calculation (derivation) of a zoom lens position and speed according to the first embodiment.

Now, a flow of control to be performed by the feedback signal calculator 206 is described with reference to flow charts of FIGS. 2 and 3. Note that, the CPU 202 controls processing of those flows in accordance with a computer program stored in a memory (not shown). FIG. 2 is a flow chart illustrating calculation (derivation) of the position and speed of the zoom lens 102 (first information) based on the output from the position detector 204 that is set as the information included in the feedback signal.

First, the processing of the CPU 202 proceeds to Step S10. In Step S10, the CPU 202 counts the pulses output from the position detector 204. Next, the processing proceeds to Step S11. In Step S11, the CPU 202 derives (calculates) the position of the zoom lens 102 based on the number of pulses counted in Step S10, and then the processing proceeds to Step S12. In Step S12, the CPU 202 differentiates the position of the zoom lens 102 that is derived in Step S11, to thereby derive the speed of the zoom lens 102. The CPU 202 repeats the above-mentioned processing in a predetermined sampling period, to thereby detect the position and speed of the zoom lens 102.

As described above, the position and speed of the zoom lens 102 are accurately derived through the flow illustrated in FIG. 2 because of the configuration in which the part between the zoom lens operation portion 101 and the position detector 204 is not influenced by the backlash. The motor 201 is engaged with the zoom lens operation portion 101 through intermediation of the gears, and hence, also through association between the rotational position and rotational speed of the motor 201 and the rotational position and rotational speed of the zoom lens 102, the position and speed of the zoom lens 102 may be obtained based on the rotational position and speed of the motor 201. However, the backlash is generated between the zoom lens operation portion 101 and the motor 201, and hence the position and speed of the zoom lens 102 that are obtained based on the pulses output from the position detector 204 do not necessarily correspond, on a one-to-one correspondence basis, to the position and speed of the zoom lens 102 that are obtained based on the rotational position and rotational speed of the motor 201 derived based on the electric current determined by the motor electric current detector 205.

Figure 3:
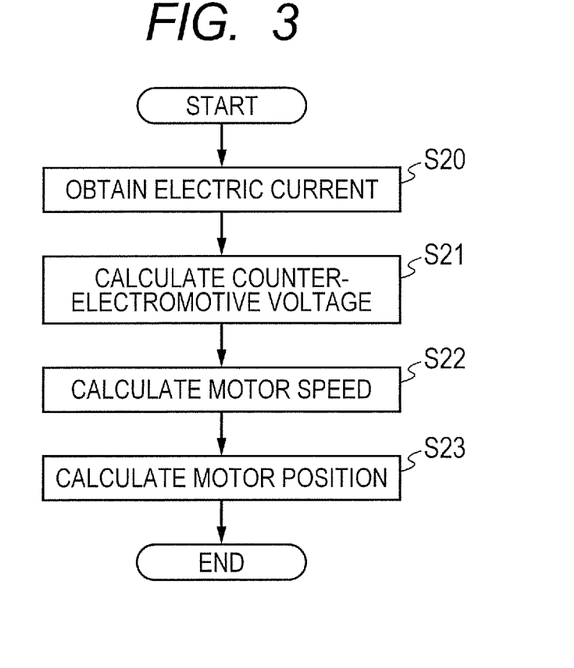
FIG. 3 is a flow chart illustrating calculation (derivation) of a position and speed of a drive unit according to the first embodiment.

FIG. 3 is a flow chart illustrating calculation (derivation) of the rotational position and rotational speed of the motor 201 (second information) based on the output from the motor electric current detector 205 that is set as the feedback signal.

First, the processing of the CPU 202 proceeds to Step S20. In Step S20, the CPU 202 obtains the electric current determined by the motor electric current detector 205. Next, the processing proceeds to Step S21. In Step S21, the CPU 202 derives a counter-electromotive voltage of the motor 201, and then the processing proceeds to Step S22. The CPU 202 derives the counter-electromotive voltage by a method described later. Due to the fact that the counter-electromotive voltage is proportional to the rotational speed of the motor, in Step S22, the CPU 202 determines the rotational speed of the motor 201 by multiplying the counter-electromotive voltage by a proportionality constant determined in advance, and then the processing proceeds to Step S23. In Step S23, the CPU 202 integrates the rotational speed of the motor, to thereby derive the rotational position of the motor. The CPU 202 repeats the above-mentioned processing in a predetermined sampling period, to thereby detect the rotational position and rotational speed of the motor 201.

Figure 4:
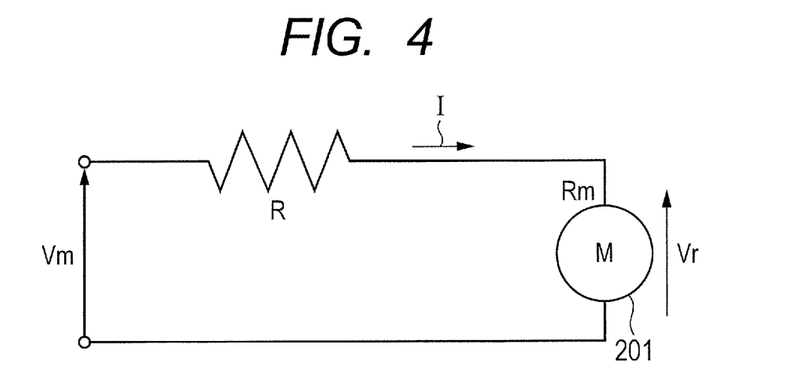
FIG. 4 is a diagram illustrating a simple equivalent circuit of a drive circuit according to the first embodiment.

Now, the method of deriving the counter-electromotive voltage in Step S21 of FIG. 3 is described with reference to FIG. 4. Components similar to those described with reference to FIG. 1 are represented by the same reference symbols, and description thereof is therefore omitted herein. FIG. 4 is a diagram illustrating a simple equivalent circuit of the drive circuit 209 of FIG. 1. In FIG. 4, Vm represents a voltage applied to the motor 201; I, a motor electric current flowing through the motor 201; Vr, a counter-electromotive voltage of the motor 201; Rm, an internal resistance of the motor 201; and R, a resistance component of the simple equivalent circuit. The following relationship is established among those elements.

$$Vr = Vm - (R + Rm) \times I \quad (1)$$

Note that, the voltage Vm is determined based on the drive signal generated by the feedback controller 208, and the motor electric current I is detected by the motor electric current detector 205. Further, the value (R+Rm) is a known value, and hence stored and held in advance. Under those conditions, the counter-electromotive voltage can be derived based on Expression (1).

The rotational position and rotational speed of the motor 201 are accurately derived through the flow illustrated in FIG. 3 because of the calculation (derivation) based on the motor electric current generated in response to the rotation of the motor 201.

The signal including the zoom lens position and speed (first information) and the rotational position and rotational speed of the motor (second information), which is derived in the manner described above, is input as a feedback signal to the feedback signal switching portion 207 described later.

Figure 5:
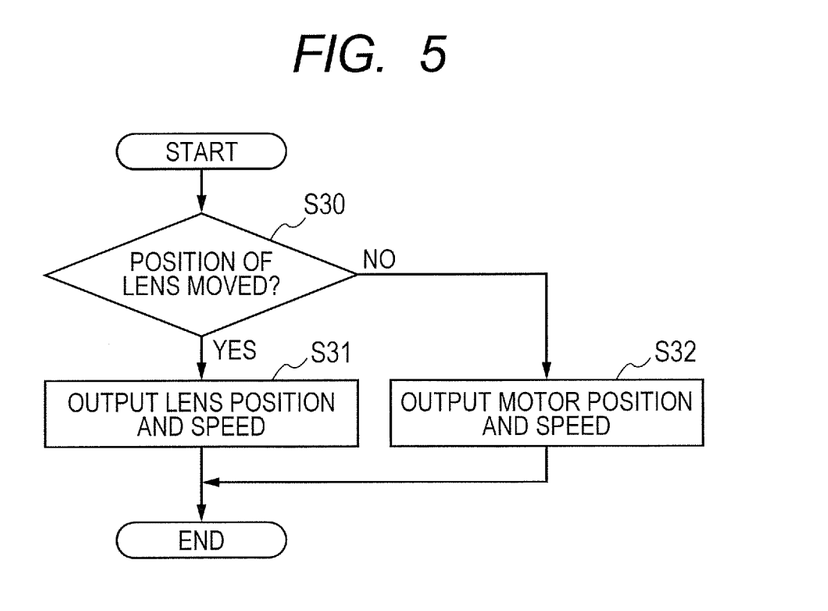
FIG. 5 is a flow chart illustrating feedback signal switching according to the first embodiment.

Now, a flow of control to be performed by the feedback signal switching portion 207 is described with reference to a flow chart illustrated in FIG. 5.

In Step S30, the processing of the CPU 202 proceeds to Step S31 when the zoom lens position derived by the feedback signal calculator (first deriving unit) 206 is changed (that is, when the position of the zoom lens is changed), whereas the processing proceeds to Step S32 when the zoom lens position derived by the feedback signal calculator 206 is not changed (that is, when the position of the zoom lens is not changed). Whether or not the position of the zoom lens is changed is determined by the feedback signal switching portion 207 based on the pulse signal from the position detector 204. In Step S31, the CPU 202 outputs, to the feedback controller 208, the zoom lens position and speed (first information) derived through the flow illustrated in FIG. 2. In Step S32, the CPU 202 outputs, to the feedback controller 208, the signal including the rotational position and rotational speed of the motor (second information) derived through the flow illustrated in FIG. 3. The CPU 202 repeats the above-mentioned processing in a predetermined sampling period.

In the manner described above, when the position of the zoom lens 102 is changed, the drive signal is generated based on the zoom lens position and speed, whereas when the position of the zoom lens 102 is not changed, the drive signal is generated based on the rotational position and rotational speed of the motor.

As described above, in this embodiment, the feedback signal switching portion 207 determines whether or not the position of the zoom lens 102 is changed. When the position of the zoom lens 102 is not changed (when the zoom lens position does not change), the motor drive is controlled based on the signal including the rotational position and rotational speed of the motor 201 (second information) that are set as the feedback signal, whereas when the position of the zoom lens 102 is changed (when the zoom lens position changes), the motor drive is controlled based on the signal including the position and speed of the zoom lens 102 (first information) that are set as the feedback signal. In the related art, the signal including the zoom lens position and speed (first information) is output to the feedback controller 208 as the feedback signal irrespective of whether or not the motor 201 is rotated through the backlash area. Therefore, during a period in which the motor 201 is rotated through the backlash area, an unintended drive signal is transmitted to the motor, which may cause the operator to feel uncomfortable with an image at the start of lens movement. That is, even when the control signal for driving the motor is output, the zoom lens to be driven is not moved, and hence a command for driving the motor to a higher degree is output, with the result that the lens may start to be moved with a shock after the backlash is eliminated. In this embodiment, on the other hand, during the period in which the motor 201 is rotated through the backlash area, the signal including the rotational position and rotational speed of the motor (second information) is set as the feedback signal. Therefore, a drive signal that is not influenced by the backlash can be transmitted to the motor, thereby attaining an effect of solving the above-mentioned problem inherent in the related art. That is, during a period in which the zoom lens position and speed are not changed but the rotational position and rotational speed of the motor are changed, the CPU 202 can perform the drive control while recognizing that the control is performed during the period in which the motor 201 is rotated through the backlash area. Further, the rotational position and rotational speed of the motor 201 are derived inside the CPU 202 through the detection of the electric current flowing through the motor 201, and hence there is no need to employ a position detector therefor. As a result, the object of the present invention can be achieved, that is, the driving apparatus capable of suppressing the influence of the backlash of the gear train of the lens operation portion can be provided without upsizing the drive apparatus and increasing the manufacturing cost due to the increase in number of hardware components.

Note that, in this embodiment, the zoom lens is taken as an example of the optical adjusting member to be driven. However, the optical adjusting member is not limited thereto, and may also be applicable to the focus lens and the iris.

Further, in this embodiment, the signal including both the position and the speed is set as the feedback signal. However, the feedback signal is not limited thereto, and signal including only the speed or the position may be set as the feedback signal.

Second Embodiment

Figure 7:
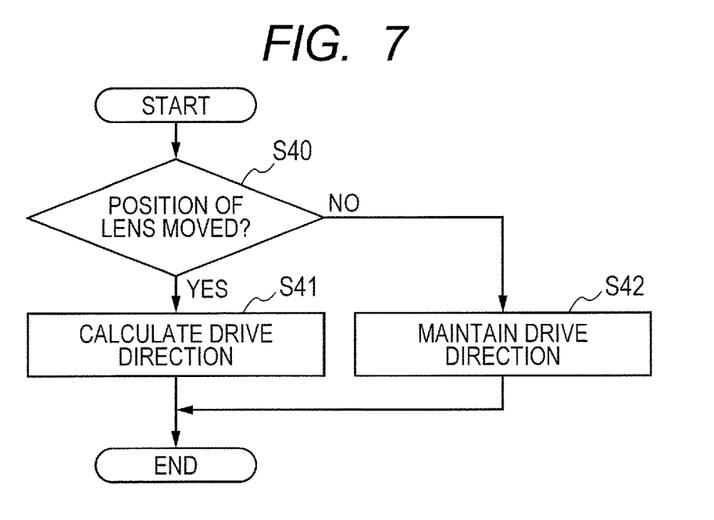
FIG. 7 is a flow chart illustrating calculation (derivation) of a drive direction according to the second embodiment.
Figure 8:
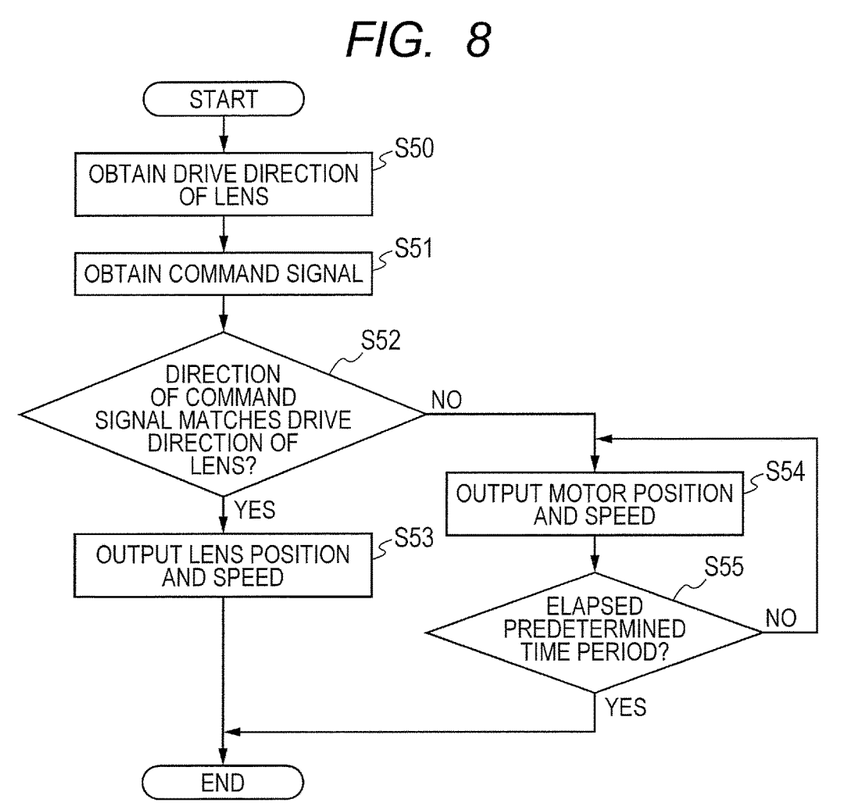
FIG. 8 is a flow chart illustrating feedback signal switching according to the second embodiment.

Now, a second embodiment of the present invention is described with reference to FIGS. 6 to 8.

In the first embodiment, based on the change in position of the zoom lens operation portion 101, the feedback signal switching portion 207 determines whether or not the motor 201 is rotated through the backlash area, to thereby switch between the signal including the zoom lens position and speed (first information) and the signal including the rotational position and rotational speed of the motor (second information) to use as the feedback signal for the drive control.

In this embodiment, as a method of determining whether or not the motor 201 is rotated through the backlash area, the feedback signal switching portion 207 compares a driving direction indicated by the command information and a drive direction of the zoom lens operation portion 101 in the previous operation. Based on a result of the comparison, the feedback signal switching portion 207 switches between the zoom lens position and speed (first information) and the rotational position and rotational speed of the motor (second information) to use as the feedback signal for the drive control.

Figure 6:
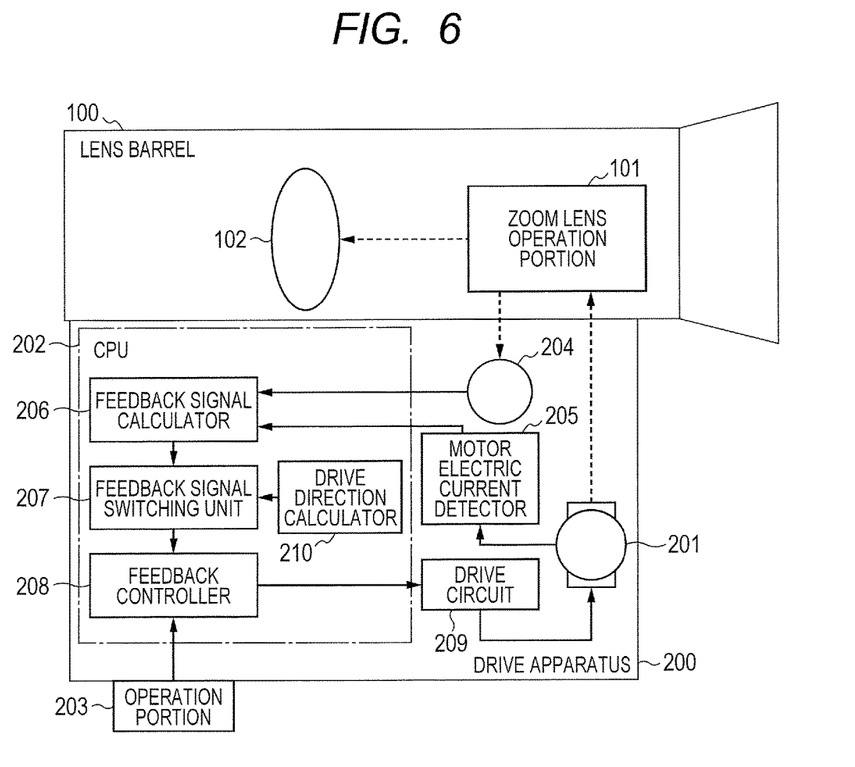
FIG. 6 is a block diagram illustrating a configuration of a driving apparatus according to a second embodiment of the present invention.

FIG. 6 illustrates a system configuration of the driving apparatus according to this embodiment. Note that, components similar to those of the first embodiment illustrated in FIG. 1 are represented by the same reference symbols, and description thereof is therefore omitted herein.

A drive direction calculator (second deriving unit) 210 of FIG. 6 derives a drive direction of the zoom lens operation portion 101 when the zoom lens operation portion 101 is driven. Now, a flow of processing to be performed by the drive direction calculator 210 is described with reference to FIG. 7.

First, the processing of the CPU 202 (drive direction deriving unit 210) proceeds to Step S40. In Step S40, the processing proceeds to Step S41 when the zoom lens position derived by the feedback signal calculator 206 was changed (when the position of the zoom lens was changed), whereas the processing proceeds to Step S42 when the zoom lens position derived by the feedback signal calculator 206 was not changed (when the position of the zoom lens was not changed). In Step S41, based on the change in zoom lens position derived by the feedback signal calculator 206, the CPU 202 determines whether the drive direction is a telephoto direction or a wide-angle direction. In Step S42, the CPU 202 updates and maintains the drive direction as the direction that is most recently determined in Step S41. The CPU 202 repeats the above-mentioned processing in a predetermined sampling period.

Now, a flow of processing to be performed by the feedback signal switching portion 207 of this embodiment is described with reference to a flow chart of FIG. 8.

First, the processing of the CPU 202 proceeds to Step S50. In Step S50, the CPU 202 obtains the drive direction maintained by the drive direction calculator 210 (derived by the drive direction deriving unit 210), and then the processing proceeds to Step S51. In Step S51, the CPU 202 obtains a command signal (command information) output from the operation portion 203, and then the processing proceeds to Step S52. In Step S52, the CPU 202 compares the drive direction of the zoom lens operation portion 101 that is obtained in Step S50 and the drive direction indicated by the command signal (command information) that is obtained in Step S51. The processing proceeds to Step S53 when both the directions match with each other, whereas the processing proceeds to Step S54 when both the directions differ from each other. In Step S53, the CPU 202 outputs the zoom lens position and speed derived by the feedback signal calculator 206. In Step S54, the CPU 202 outputs the rotational position and rotational speed of the motor derived by the feedback signal calculator 206, and then the processing proceeds to Step S55. In Step S55, the processing is ended when a predetermined time period has elapsed, whereas the processing of Step S54 is repeated when the predetermined time period has not elapsed. Note that, the predetermined time period in this case is set as a time period in which the backlash is eliminated.

Note that, in Step S55, whether or not the backlash is eliminated is determined based on whether or not the predetermined time period has elapsed, but the determination is not limited thereto. Whether or not the backlash is eliminated may be determined based on whether or not the motor 201 is rotated by a predetermined amount.

As described above, in this embodiment, when the zoom lens operation portion 101 is to be driven in response to the command signal (command information) transmitted to the drive apparatus 200, the drive direction of the zoom lens operation portion 101 in the previous operation and the drive direction in which the zoom lens is driven by the transmitted command signal (command information) are compared to each other. As a result of the comparison, when both the directions match with each other, it is determined that the motor 201 is not rotated through the backlash area. When both the directions differ from each other, on the other hand, it is determined that the motor 201 is rotated through the backlash area and the drive force is then transmitted from the motor 201 to the zoom lens operation portion 101. In other words, it is determined whether the drive direction of the zoom lens operation portion 101 is the same rotational direction as or an opposite rotational direction to the previous drive direction. Based on the determination, it is switched whether to output the zoom lens position and speed or the rotational position and rotational speed of the lens, thereby being capable of attaining an effect equivalent to that of the first embodiment.

Third Embodiment

Now, a third embodiment of the present invention is described with reference to FIGS. 9 and 10.

In the second embodiment, based on whether the zoom lens operation portion 101 is driven in a reverse direction or a forward direction, the feedback signal switching portion 207 determines whether or not the motor 201 is rotated through the backlash area.

In this embodiment, as a method of determining whether or not the motor 201 is rotated through the backlash area, the feedback signal switching portion 207 compares a drive direction indicated by the command signal (command information) and a gravity direction of the zoom lens 102. Based on a result of the comparison, the feedback signal switching portion 207 switches whether to output the zoom lens position and speed or the rotational position and rotational speed of the lens.

Further, in this embodiment, in order to eliminate influence of delay to be imposed on the operability, when the drive speed indicated by the input command signal (command information) is equal to or less than a predetermined threshold value, the feedback signal switching portion 207 outputs a signal including the zoom lens position and speed (first information) as the feedback signal.

Further, in this embodiment, when an electric current limiting circuit is configured, in order to eliminate influence of erroneous detection of the counter-electromotive voltage at the time when the electric current value has reached a limit value, the feedback signal switching portion 207 outputs a signal including the zoom lens position and speed (first information) as the feedback signal.

Figure 9:
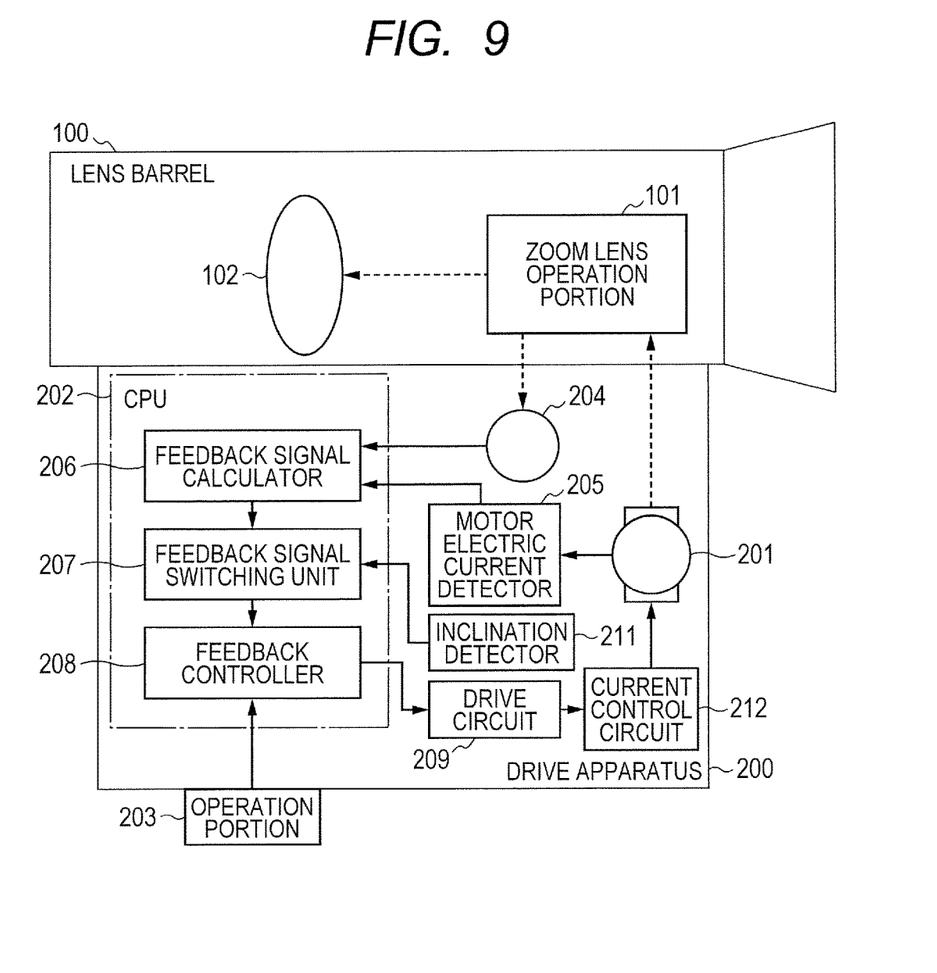
FIG. 9 is a block diagram illustrating a configuration of a driving apparatus according to a third embodiment of the present invention.
Figure 10:
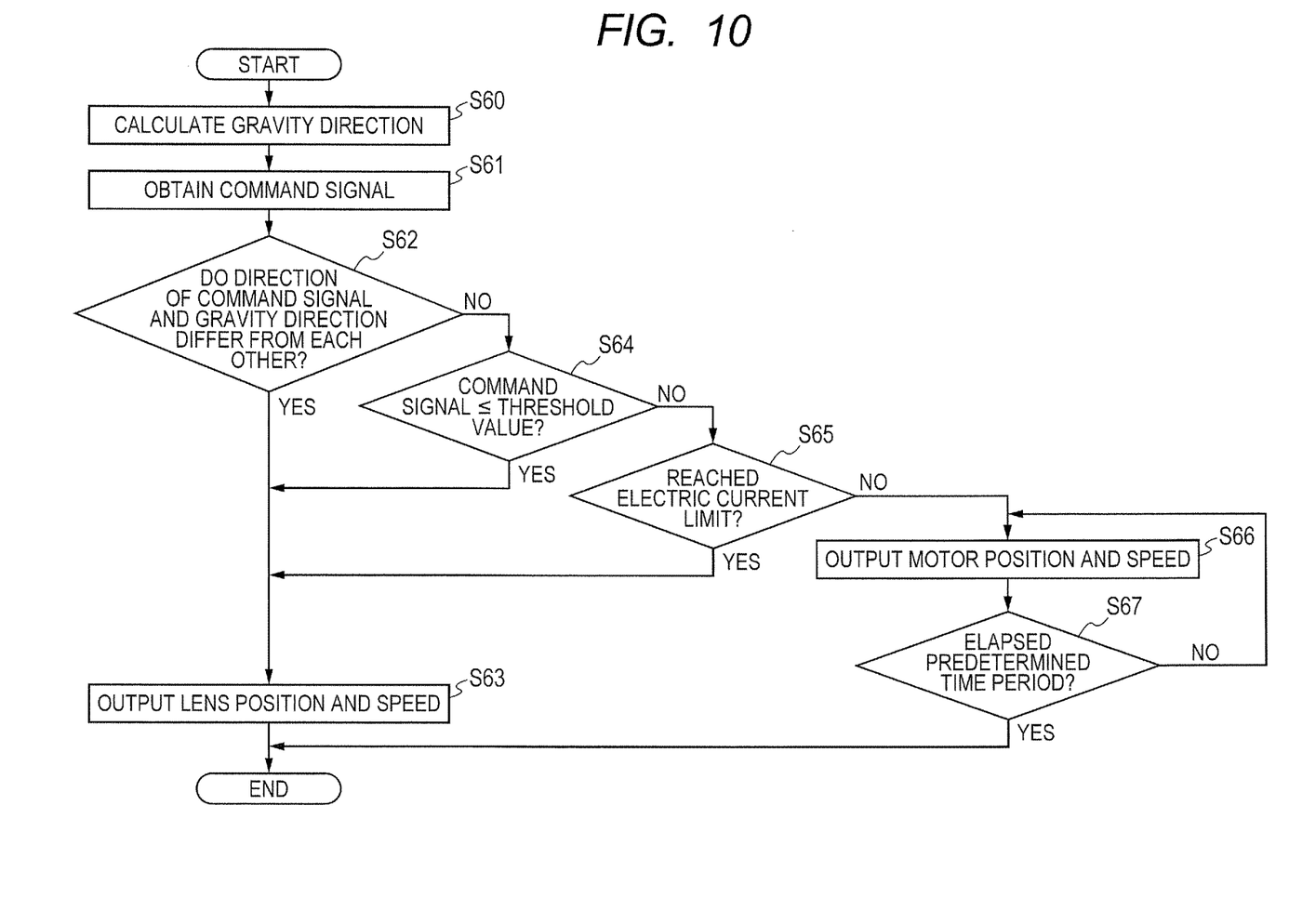
FIG. 10 is a flow chart illustrating feedback signal switching according to the third embodiment.

Now, a system configuration diagram of a driving apparatus according to this embodiment illustrated in FIG. 9 is described. Note that, components similar to those of the first embodiment illustrated in FIG. 1 are represented by the same reference symbols, and description thereof is therefore omitted herein.

An inclination detector 211 is configured in the drive apparatus 200 so as to detect inclination of the drive apparatus 200. Note that, examples of the inclination detector 211 as used herein include a publicly-known acceleration sensor. Further, in FIG. 9, the inclination detector 211 is configured in the drive apparatus 200, but is not limited thereto. The inclination detector 211 may be configured in the lens barrel 100.

An electric current limiting circuit 212 is configured in the drive apparatus (limiter) 200. The drive apparatus 200 is configured to limit the electric current when the electric current is equal to or more than an upper limit of power consumption that is set in advance. When the electric current flowing through the motor 201 is equal to or more than an electric current limit value that is set based on the power consumption of the drive apparatus 200, the electric current limiting circuit 212 adjusts the voltage to be applied to the motor 201, to thereby limit the electric current flowing through the motor 201 to be less than the electric current limit value.

Now, a flow of processing to be performed by the feedback signal switching portion 207 of this embodiment is described with reference to a flow chart of FIG. 10.

First, the processing of the CPU 202 proceeds to Step S60. In Step S60, the CPU 202 derives the gravity direction of the zoom lens 102 based on the inclination of the drive apparatus 200 that is output from the inclination detector 211, and then the processing proceeds to Step S61. In Step S61, the CPU 202 obtains a command signal (command information) output from the operation portion 203, and then the processing proceeds to Step S62. In Step S62, the CPU 202 compares the gravity direction of the lens that is derived in Step S60 and the drive direction indicated by the command signal (command information) that is obtained in Step S61. The processing proceeds to Step S63 when both the directions differ from each other, whereas the processing proceeds to Step S64 when both the directions match with each other.

Next, in Step S64, the processing proceeds to Step S63 when the drive speed indicated by the command signal (command information) is equal to or less than a predetermined threshold value described later, whereas the processing proceeds to Step S65 when the speed indicated by the command signal is more than the predetermined threshold value. In this case, the predetermined threshold value is set by determining in advance such a speed that the response of the zoom lens operation portion 101 does not cause the operator to feel uncomfortable with the operation.

In Step S65, the processing proceeds to Step S63 when the electric current detected by the motor electric current detector 205 has reached the electric current limit value, whereas the processing proceeds to Step S66 when the electric current detected by the motor electric current detector 205 has not reached the electric current limit value. In Step S66, the CPU 202 outputs a signal including the rotational position and rotational speed of the motor (second information) derived by the feedback signal calculator 206, and then the processing proceeds to Step S67. In Step S67, the processing is ended when a predetermined time period has elapsed, whereas the processing of Step S66 is repeated when the predetermined time period has not elapsed. Note that, the predetermined time period in this case is set as a time period in which the backlash is eliminated. Further, the determination of whether or not the backlash is eliminated is not limited to the determination based on the elapse of the predetermined time period, and may be performed based on whether or not the motor 201 is rotated by a predetermined amount.

That is, the inclination detector 211 detects the inclination of the driving apparatus with respect to the vertical direction. The feedback signal switching portion 207 selects the signal including the position and speed of the zoom lens (movable optical member) (first information) as the feedback signal when the drive direction indicated by the command information, which is derived based on the inclination of the installation posture of the drive apparatus 200, does not have a component in a vertically downward direction (gravity drop direction). Further, the feedback signal switching portion 207 selects the signal including the rotational position and rotational speed of the motor (drive unit) (second information) as the feedback signal when the drive direction indicated by the command information has the component in the vertically downward direction.

As described above, in this embodiment, when the zoom lens operation portion 101 is to be driven under a state in which the driving apparatus is inclined, the gravity direction of the zoom lens 102 and the drive direction indicated by the transmitted command signal are compared to each other. When the driving apparatus is used in a state of being inclined significantly, due to the self-weight of the zoom lens 102, the meshing between the zoom lens operation portion 101 and the gear connected thereto is determined uniquely depending on the gravity direction. That is, when the zoom lens operation portion 101 is to be driven in the same direction as the gravity direction of the zoom lens 102, the motor 201 is rotated through the backlash area. When the zoom lens operation portion 101 is to be driven in a different direction from the gravity direction, on the other hand, the motor 201 is not rotated through the backlash area. Therefore, through the comparison between the gravity direction of the zoom lens 102 and the drive direction indicated by the command signal (command information), it can be determined whether or not the motor 201 is rotated through the backlash area. Based on the determination, it is switched whether to output the zoom lens position and speed or the rotational position and rotational speed of the motor, thereby being capable of attaining an effect equivalent to that of the first embodiment.

Further, in this embodiment, when the drive speed indicated by the input command signal (command information) is equal to or less than the predetermined threshold value, signal including the zoom lens position and speed (first information) is output as the feedback signal. When a command signal (command information) indicating a low driving speed is input, the motor is rotated at the drive speed indicated by the input command signal (command information) even during the period in which the motor 201 is rotated through the backlash area, that is, before the drive force is transmitted to the zoom lens operation portion 101. Therefore, the slower the drive speed indicated by the command signal (command information) is, the slower the speed of rotation of the motor 201 through the backlash area is. That is, a time period required until the drive force is transmitted to the zoom lens operation portion 101 is longer, with the result that the drive response is decreased. In this embodiment, on the other hand, when the drive speed indicated by the command signal (command information) is equal to or lower than the predetermined speed, a signal including the zoom lens position and speed is set as the feedback signal. As a result, there is attained an effect of preventing the decrease in drive response of the zoom lens 102 when a command signal (command information) indicating a low speed driving is transmitted.

Further, in this embodiment, when the electric current detected by the motor electric current detector 205 has reached the electric current limit value set in advance, the feedback signal switching portion 207 outputs a signal including the zoom lens position and speed (first information) to the feedback controller 208 as the feedback signal. When an electric current equal to or more than the electric current limit value is to flow through the motor 201, the electric current limiting circuit 212 suppresses the voltage to be applied to the motor 201. Thus, the voltage to be derived based on the drive signal output from the feedback controller 208 and the voltage to be applied to the motor 201 differ from each other, with the result that the feedback signal calculator 206 may derive a different value from that of an actually generated counter-electromotive voltage. Therefore, there is a risk in that an erroneous rotational position and rotational speed of the motor are derived and set as the feedback signal. In this embodiment, on the other hand, when the electric current detected by the motor electric current detector 205 is equal to or more than the limit value, a signal including the zoom lens position and speed (first information) is set as the feedback signal. As a result, there is attained an effect of preventing the signal including the erroneous rotational position and rotational speed of the motor (second information) from being derived and output as the feedback signal.

By constructing a lens apparatus including the driving apparatus of the present invention, and further constructing an image pickup apparatus including the lens apparatus and an image pickup element configured to receive light from the lens apparatus, the following advantage is attained. That is, it is possible to attain such an effect of the present invention that the influence of the backlash of the gear train of the lens operation portion is suppressed without upsizing the drive apparatus and increasing the manufacturing cost due to the increase in number of hardware components.

The exemplary embodiments of the present invention are described above, but the present invention is not limited to those embodiments and may be modified and changed variously within the scope of the gist of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-268341, filed Dec. 26, 2013, which is hereby incorporated by reference herein in its entirety.

What is claimed is:

1. A driving apparatus to be connected to a lens barrel including a movable optical member so as to drive the movable optical member, the lens driving apparatus comprising:
   a drive unit driving the movable optical member;
   a controller controlling the drive unit;
   a first deriving unit deriving: a first information indicating at least one of a position or a speed of the movable optical member; and a second information indicating at least one of a position or a speed of the drive unit based on a counter-electromotive voltage generated through the drive of the drive unit; and
   a selection unit configured to select the first information or the second information as a selected information in accordance with a state of a backlash of the drive unit,
   the controller controlling the drive unit based on: the first information or the second information selected by the selection unit; and command information to direct driving of the movable optical member.

2. A driving apparatus according to claim 1, wherein the selection unit is configured to:
   select the first information when the first information is changed; and
   select the second information when the first information is not changed.

3. A driving apparatus according to claim 1, further comprising a second deriving unit deriving a drive direction of the movable optical member,
   wherein the selection unit is configured to:
   select the first information when the drive direction derived by the second deriving unit matches with a drive direction indicated by the command information; and select the second information when the drive direction derived by the second deriving unit differs from the drive direction indicated by the command information.

4. A driving apparatus according to claim 1, further comprising an inclination detector detecting inclination of the driving apparatus with respect to a vertical direction,
wherein the selection unit is configured to:
select the first information when a drive direction indicated by the command information, which is derived based on the inclination detected by the inclination detector, does not have a component in a vertically downward direction; and
select the second information when the drive direction indicated by the command information has the component in the vertically downward direction.

5. A driving apparatus according to claim 1,
wherein the command information comprises an information indicating a drive speed of the movable optical member, and
wherein the selection unit is configured to select the first information when the drive speed indicated by the command information is equal to or less than a predetermined threshold value irrespective of the state of the backlash of the drive unit.

6. A driving apparatus according to claim 1, further comprising a limiter limiting an electric current flowing through the drive unit to be less than an upper limit,
wherein the selection unit is configured to select the first information when the limiter limits the electric current to be less than the upper limit irrespective of the state of the backlash of the drive unit.

7. A apparatus including a movable optical member, comprising:
a driving apparatus to drive the movable optical member, the driving apparatus comprising:
a drive unit driving the movable optical member;
a controller controlling the drive unit;
a first deriving unit deriving: a first information indicating at least one of a position or a speed of the movable optical member; and a second information indicating at least one of a position or a speed of the drive unit based on a counter-electromotive voltage generated through the drive of the drive unit; and
a selection unit configured to select the first information or the second information as a selected information in accordance with a state of a backlash of the drive unit,
the controller controlling the drive unit based on: the first information or the second information selected by the selection unit; and command information to direct driving of the movable optical member; and
a lens barrel having the movable optical member driven by the driving apparatus.

8. An image pickup apparatus, comprising:
a lens apparatus including a movable optical member, comprising a driving apparatus to drive the movable optical member, the driving apparatus comprising:
a drive unit driving the movable optical member;
a controller controlling the drive unit;
a first deriving unit deriving: a first information indicating at least one of a position or a speed of the movable optical member; and a second information indicating at least one of a position or a speed of the drive unit based on a counter-electromotive voltage generated through the drive of the drive unit; and
a selection unit configured to select the first information or the second information as a selected information in accordance with a state of a backlash of the drive unit,
the controller controlling the drive unit based on: the first information or the second information selected by the selection unit; and command information to direct driving of the movable optical member; and
an image pickup element configured to receive light from the lens apparatus.

* * * * *